(12) United States Patent
Hourtane et al.

(10) Patent No.: US 10,500,978 B2
(45) Date of Patent: Dec. 10, 2019

(54) ASSEMBLY CONSISTING OF AN ELECTRIC VEHICLE AND A SYSTEM FOR STATIONARY CHARGING BY CONDUCTION; ASSOCIATED SYSTEM, FACILITY, VEHICLE AND METHOD

(71) Applicant: Alstom Transport Technologies, Saint-Ouen (FR)

(72) Inventors: Jean-Luc Hourtane, Bouc Bel Air (FR); Yann Chaintron, Vitrolles (FR)

(73) Assignee: Alstom Transport Technologies, Saint-Ouen (FR)

( * ) Notice: Subject to any disclaimer, the term of this patent is extended or adjusted under 35 U.S.C. 154(b) by 72 days.

(21) Appl. No.: 15/579,428

(22) PCT Filed: Jun. 8, 2016

(86) PCT No.: PCT/EP2016/063057
§ 371 (c)(1),
(2) Date: Dec. 4, 2017

(87) PCT Pub. No.: WO2016/198465
PCT Pub. Date: Dec. 15, 2016

(65) Prior Publication Data
US 2018/0141452 A1 May 24, 2018

(30) Foreign Application Priority Data
Jun. 8, 2015 (FR) ...................................... 15 55205

(51) Int. Cl.
*B60L 53/30* (2019.01)
*B60L 5/42* (2006.01)
*B60L 53/14* (2019.01)

(52) U.S. Cl.
CPC ................. *B60L 53/32* (2019.02); *B60L 5/42* (2013.01); *B60L 53/14* (2019.02); *B60L 2250/10* (2013.01);
(Continued)

(58) Field of Classification Search
CPC ........ B60L 5/42; B60L 11/1816; B60L 53/32; B60L 53/14; B60L 2250/10;
(Continued)

(56) References Cited

U.S. PATENT DOCUMENTS 3,786,204 A * 1/1974 Laurent ..................... B60L 5/08
                                                                         191/48
4,563,626 A * 1/1986 Ohtake .................. A63H 29/22
                                                                         320/103
(Continued)

FOREIGN PATENT DOCUMENTS

| DE | 2330255 A1 | 1/1975 |
| EP | 2524836 A2 | 11/2012 |
| FR | 2966397 A1 | 4/2012 |

OTHER PUBLICATIONS

Search Report dated Apr. 6, 2016 during the prosecution of French Patent Application No. FR 15 55205.
(Continued)

*Primary Examiner* — M Baye Diao
(74) *Attorney, Agent, or Firm* — Troutman Sanders LLP (57) ABSTRACT

An assembly made up of a recharging system including a power supply contact on the ground, and a switching device, to bring the power supply contact to a supply voltage delivered by a source to which the recharging system is connected, and a vehicle including a contact shoe electrically connected to onboard energy storage means, the contact shoe being placed below the vehicle and movable between a high position and a low position, the vehicle
(Continued)

including a control device able to command the movement of the contact shoe from the high position to the low position so that it is placed in contact with the power supply contact, only when the vehicle is stopped in said predetermined position allowing the capture of energy from the recharging system, in which the footprint of the vehicle covers the power supply contact.

12 Claims, 4 Drawing Sheets

(52) U.S. Cl.
CPC ........ *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC ... Y02T 90/121; Y02T 90/14; Y02T 10/7005; Y02T 10/7072; Y02T 90/128
USPC ........................................................ 320/109
See application file for complete search history.

(56) References Cited

U.S. PATENT DOCUMENTS

| | | | |
|---|---|---|---|
| 5,706,735 A * | 1/1998 | Lund | B61B 13/00 104/130.07 |
| 6,546,877 B2 * | 4/2003 | Sanzo | B61F 5/50 105/157.1 |
| 2005/0129490 A1 * | 6/2005 | Hutchins | B60P 1/4414 414/462 |

OTHER PUBLICATIONS

International Search Report dated Sep. 7, 2016 issued in corresponding International Application No. PCT/EP2016/063057.

* cited by examiner

ASSEMBLY CONSISTING OF AN ELECTRIC VEHICLE AND A SYSTEM FOR STATIONARY CHARGING BY CONDUCTION; ASSOCIATED SYSTEM, FACILITY, VEHICLE AND METHOD

CROSS-REFERENCE TO RELATED APPLICATIONS

This is a U.S. national phase application under 35 U.S.C. § 371 of International Patent Application No. PCT/EP2016/063057, filed Jun. 8, 2016, and claims benefit of priority to French Patent Application No. 15 55205, filed Jun. 8, 2015. The entire contents of these applications are hereby incorporated by reference.

FIELD OF TECHNOLOGY

The invention relates to the field of conduction stationary recharging systems for an electric vehicle.

BACKGROUND

In the present document, although the embodiment described below in detail relates to an electric vehicle that is a tram, the invention is not limited to this particular type of electric vehicle, but is applicable to all types of electric vehicles, irrespective of whether they are guided, such as subways, trucks, automobiles, buses, etc.

Different systems are known for powering an electric vehicle in order to supply it with electricity, either used directly through propulsion means of the vehicle, or stored in energy storage means of the vehicle.

Dynamic recharging systems are thus known that make it possible to power the electric vehicle when it moves. For a vehicle such as a tram, the example of such a dynamic system consists of a power supply system through the roof, for example of the catenary type. For a vehicle such as a car, roadways have been proposed incorporating a conductive track, brought to a power supply potential. The car includes means for capturing the current in contact with the conductive track throughout the movement of the vehicle.

Also known are static recharging systems, which make it possible to recharge energy storage means of the vehicle when the latter is stopped.

If the stop is extended, reference will be made to a fixed recharging system. For the case of an electric car, this for example involves parking the vehicle in a specific parking place located near a power terminal connected to the sector. Using a simple power cable provided on the car and equipped with an appropriate connector, the energy storage means of the car are electrically connected to the terminal to be recharged there. With these stationary systems, the recharging times are long: several hours for complete recharging of the batteries of a light vehicle, such as a passenger car. The vehicle is consequently unavailable for several hours. It is therefore stopped during recharging, in that its engine is off and it is not in immediate working condition. The supply powers provided by such stationary systems are relatively low, since the energy needed to recharge the vehicle is captured during a long recharging time.

If the stop is short, approximately several tens of seconds, reference will be made to a stationary recharging system. Such a system is able to transfer, from the ground toward the electric vehicle, a relatively significant power, compared to the dynamic systems or fixed static systems. The recharging being quick and the stop being short, the vehicle stays in an operating condition: its speed is null, but it is ready to accelerate immediately to leave the electric current capture position.

Among stationary systems, induction recharging systems are known. The vehicle is provided with an armature that is placed, when the car arrives in a capture location, over a winding, provided below the surface of the ground. The magnetic flux generated by the winding is then able to generate, in the armature, a current making it possible to recharge the batteries of the vehicle.

However, such induction stationary recharging systems do not make it possible to provide sufficient power to recharge a heavy electric vehicle, such as a tram, a truck, etc., or to guarantee a short stop time for complete recharging of the energy storage means of a light vehicle.

Furthermore, induction systems create significant magnetic fields near the vehicle during the recharging. The health effects of magnetic fields are not yet well known.

SUMMARY

The invention therefore aims to propose a conduction stationary recharging system, as an alternative to the known systems, in particular allowing a greater power transfer than the induction stationary recharging systems, having a reduced deployment cost, and having a high safety level for people located around the vehicle while it is recharging.

The invention therefore relates to an assembly made up of an electric vehicle of a conduction stationary recharging system for recharging said electric vehicle when it is stopped in a first predetermined position allowing the capture of energy from the recharging system, the recharging system including a power supply contact, positioned on the ground and associated with a current return means, and a switching device able to bring the power supply contact to a supply voltage delivered by an electricity source to which the recharging system is connected, the vehicle including a contact shoe electrically connected to onboard energy storage means, the contact shoe being placed below a body of the vehicle and movable between a high position, away from the power supply contact, and a low position, in contact with the power supply contact, the vehicle including a control device able to command the movement of the contact shoe from the high position to the low position so that it is placed in contact with the power supply contact, only when the vehicle is stopped in said predetermined position, capture position in which the footprint of the vehicle covers the power supply contact.

According to particular embodiments, the assembly includes one or more of the following features, considered alone or according to all technically possible combinations:

the assembly includes two-way communication equipment between the recharging system and the vehicle, including a transceiver module on the ground connected to an antenna on the ground situated near the power supply contact, and an onboard transceiver module connected to an onboard antenna, supported by the contact shoe, the ground transceiver device being able to transmit a first signal continuously over a significant range, the onboard transceiver module being able to detect the first signal in the high position and low position of the contact shoe, the first signal, when it is received, indicating that the contact shoe is over a power supply contact, the onboard transceiver module being able to transmit a second signal over a reduced range, the ground transceiver module being able to detect the second signal only in the low position of the contact shoe, the second signal, when it is received, indicating that the contact shoe is in contact with the power supply contact.

The control device is able to detect that the contact shoe, placed in contact with the power supply contact, is brought to a power supply potential and, consequently, to electrically connect the contact shoe to the energy storage means by commanding the closing of an onboard switch.

The vehicle is a vehicle guided along a track including at least one metal rail and the current return means is made up of said rail connected to a reference potential, or the vehicle is a non-guided vehicle and the current return means is made up of a reference contact connected to a reference potential.

The command device includes, in series between the source and the power supply contact, a main contactor and a disconnecting switch, making it possible to place the power supply contact exclusively either at the power supply potential, or the reference potential.

The command device includes a contactor in parallel with the assembly formed by the main contactor and the disconnecting switch.

A power supply contact includes a conductive track, with which the contact shoe of a vehicle is able to come into contact, and an insulating soleplate for fastening the power supply contact on the ground of the track, the insulating soleplate being provided with a peripheral channel for receiving the ground antenna.

The assembly is able to deliver a power of about 1 MW, the power supply potential being between 600 V and 1000 V, preferably equal to 760 V.

The invention also relates to a conduction stationary recharging system intended to be integrated into the preceding assembly.

The invention also relates to a facility for powering an electric vehicle including a plurality of recharging systems according to the preceding system.

Preferably, the facility includes, by predetermined position of the electric vehicle allowing recharging of the latter, at least two conduction stationary recharging systems.

The invention also relates to a rail vehicle intended to be integrated into the preceding assembly.

The invention also relates to a method for using the preceding assembly including the following steps: transmission, by the ground, of a first long-range signal; detection, from onboard, of the first signal transmitted by the ground, indicative of the fact that the contact shoe is located over a power supply contact of a recharging system; commanding the lowering of the contact shoe so that it comes into contact with the power supply contact; transmission, from onboard, of a second short-range signal; reception, by the ground, of the second signal, indicative of the placement of a contact shoe in contact with the recharging contact; and commanding the power contactor on the ground and the onboard power contactor making it possible to bring the power supply contact to the power supply potential and enabling the connection of the contact shoe to the onboard energy storage means to begin the recharging.

Preferably, the method further comprises the following steps at the end of recharging: commanding the opening of the onboard contactor to electrically isolate the contact shoe from the energy storage means; stopping the transmission of the second signal transmitted from onboard; detecting the end of transmission of the second signal by the ground and commanding the opening of the power contactor to place the power supply contact at the reference potential; detecting that the contact shoe is at the reference potential and commanding the movement of the contact shoe away from the power supply contact; and allowing the electric vehicle to restart.

BRIEF DESCRIPTION OF DRAWINGS

The invention will be better understood and other features, aims and advantages thereof will appear more clearly in light of the following description of one particular embodiment of the invention, provided solely as an exemplary and non-limiting example, this description being done in reference to the appended drawings, in which.

DETAILED DESCRIPTION

Figure 1:
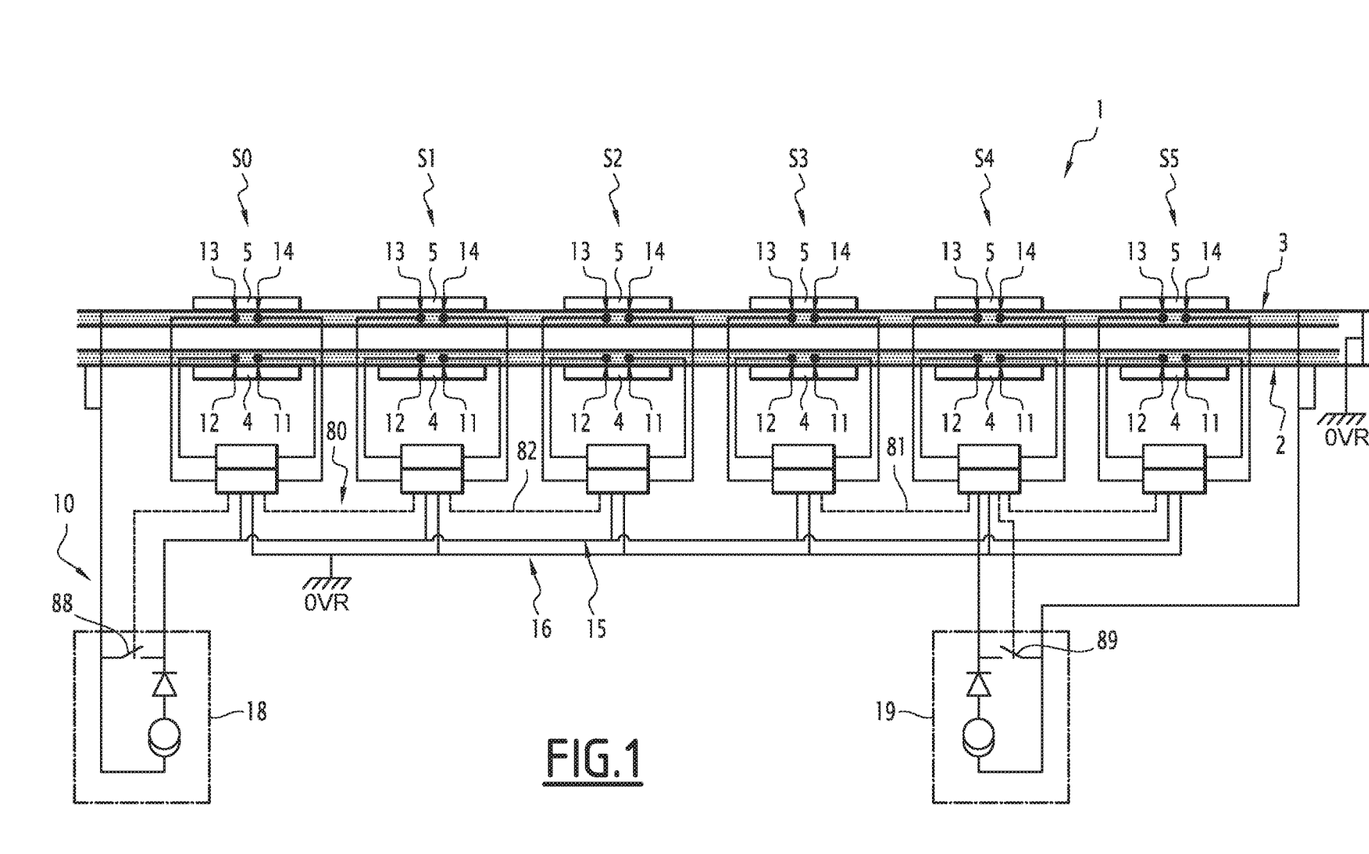
FIG. 1 is a diagrammatic illustration of a circulation line of a tram, the different stations of which are equipped with conduction stationary recharging systems according to the invention.

FIG. 1 diagrammatically shows a tram line 1, for example including a first track 2, for the outbound journey, and a second track 3, for the return journey, which allow trams to circulate between terminal stations S0 and S5, passing through intermediate stations. In FIG. 1, four intermediate stations S1, S2, S3 and S4 are shown.

In the embodiment of FIG. 1, each station includes two platforms. The first platform 4 of a station allows the transfer of passengers with a tram traveling on the first track 2 and stopped at the station in question. The second platform 5 of a station allows the transfer of passengers with a tram traveling on the second track 3 and stopped at the station in question.

FIG. 1 is equipped with a ground recharging facility 10, including a plurality of conduction stationary recharging systems, situated at the station and allowing the trams to capture electricity when stopped at the station. The facility 10 also includes a power grid 15 and one or more power sub-station(s) 18, 19, making up an electricity source for the recharging systems.

In the embodiment described here in detail, the ground recharging facility allows the power supply of trams over the entire line. Alternatively, the ground recharging facility is dedicated to supplying power to trams over only a section of the line. This section is framed by sections equipped with their own power supply facility, for example a ground recharging facility, or a catenary recharging facility, or a mixed recharging facility, i.e., by catenary and by the ground.

The platform for each station is equipped with a pair of conduction stationary recharging systems. Each system allows the transfer of electricity from the ground toward a tram stopped along the platform in question, during a duration substantially corresponding to the transfer time for passengers, i.e., typically between five and fifty seconds.

The presence of two recharging systems per platform allows redundancy, so as to guarantee, if one of the two recharging systems fails, that the tram will be able to be recharged by using the other recharging system. One thus ensures high availability of the facility 10, throughout all of the movement of the trams.

Thus, as shown in FIG. 1, for example for the station S1, the first platform 4 is equipped with a first front recharging system 11 and a first rear recharging system 12, and the second platform 5 is equipped with a second front recharging system 13 and a second rear recharging system 14. The qualifiers of front and rear are defined relative to the travel direction of the trams on the track in question.

The recharging systems being identical to one another, unless otherwise mentioned, the description will be done omitting the qualifiers of first and second or front and rear and referring more particularly to the first front recharging system 11.

The power supply grid 15, in the embodiment described here in detail, is single-phase. It includes a phase cable at the power supply potential.

The power supply grid 15 is for example connected to two power supply sub-stations 18 and 19. The first sub-station 18 is provided at the station S0, while the second sub-station 19 is provided at the station S4. A sub-station constitutes a connecting interface for connecting the facility 10 to the general grid of the electricity provider. A sub-station makes it possible to shape the current necessary to recharge trams.

While one of the terminals of each sub-station is connected to the grid 15, the other terminal is connected to at least one of the rolling rails of the track, i.e., at a reference potential, called "zero volt rail" or 0 VR in the following. The reference potential is close to the ground potential.

The reference cable 16 is also at the reference potential. To that end, it is regularly connected to at least one rolling rail of the track, by connecting cables 17.

The facility 10 is able to apply a voltage between 600 and 1000 V, preferably 750 V, corresponding to the separation between the power supply and reference potentials. In light of a stop time of several tens of seconds, a recharging system delivers a power of approximately 1 MW.

Many alternatives of the power supply grid and sources of the facility may be considered.

In reference now to FIGS. 2 and 3, a recharging system and electric vehicle able to operate with this system will be described.

In general, a conduction stationary recharging system includes a power supply contact, installed on the ground of the track, between the lines of rails.

The system also includes, in a housing on the side part of the track, a switching device, making it possible to connect the power supply contact to the power supply potential delivered by the power grid 15 or to the reference potential of the reference cable 16, and a monitoring device, making it possible to isolate the switching device from the source in case of malfunction.

Figure 2:
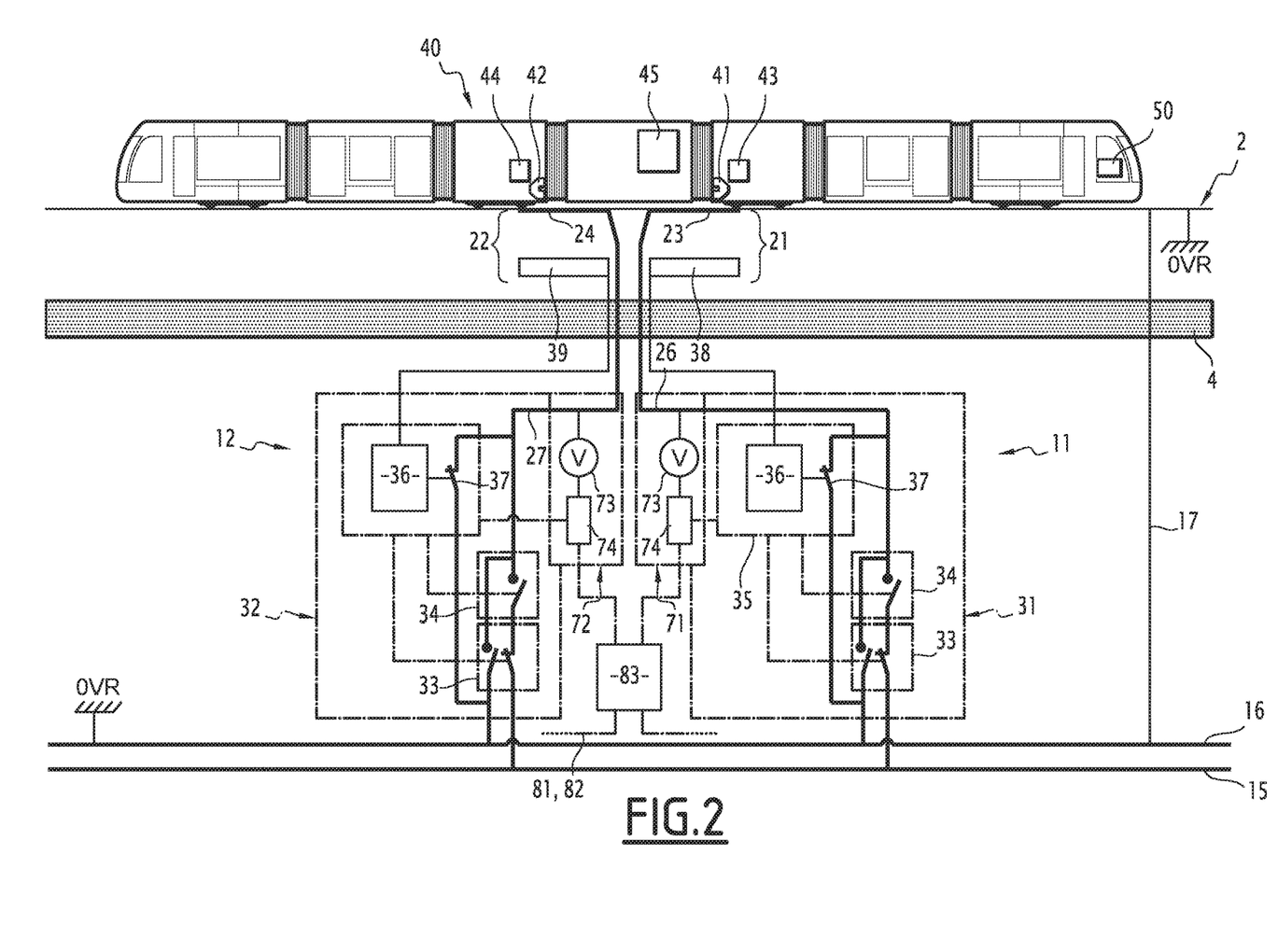
FIG. 2 is a diagrammatic illustration of a pair of stationary recharging systems according to the invention equipping one of the platforms of a station of FIG. 1, a tram being stopped in a predetermined position allowing the transfer of electricity from the ground to onboard.

Thus, in FIG. 2, the front system 11 includes a power supply contact 21, a switching device 31 and a monitoring device 71, and the rear system 12 includes a power supply contact 22, a switching device 32 and a monitoring device 72.

A tram 40 includes two contact shoes, front 41 and rear 42, respectively, mounted moving below the body of the tram 40 and able to come into contact, respectively, with the power supply contact 21 of the front recharging system 11 and the power supply contact 22 of the rear recharging system 12, when the tram 40 is stopped along the platform, in a predetermined position making it possible to capture current.

During the recharging of the electric vehicle, the footprint of the latter covers the power supply contact. There is therefore no risk for people moving around the electric vehicle of being electrocuted.

In more detail, the switching device 31 of the front recharging system 11 incorporates, in series between the power grid 15 and a connecting cable 26 for connecting to the power supply contact 21, a disconnecting switch 33 and a main contactor 34. Similarly, the switching device 32 of the rear recharging system 12 incorporates, in series between the power grid 15 and a connecting cable 27 for connecting to the power supply contact 22, a disconnecting switch 33 and a main contactor 34.

The main contactor 34 includes an input terminal connected to a first output terminal of the disconnecting switch 33 and an output terminal connected to the connecting cable 26. In a closed state of the main contactor 34, there is electric continuity between its input and output. In an open state of the main contactor 34, there is electric discontinuity between its input and output.

The disconnecting switch 33 has a first input terminal connected to the grid 15, a second input terminal connected to the reference cable 16, a first output terminal connected to the input terminal of the main contactor 34 and a second output terminal directly connected to the connecting cable 26 to the power supply contact 21. In a closed state of the disconnecting switch 33, there is electric continuity between the first input and output terminals and electric discontinuity between the second input and output terminals. In an open state of the disconnecting switch 33, there is electric discontinuity between the first input and output terminals and electric continuity between the second input and output terminals.

The switching device 31 also includes a control module 35 incorporating a ground transceiver module 36 and a secondary contactor 37.

The secondary contactor 37 includes an input terminal connected to the reference cable 16 and an output terminal connected to the connecting cable 26 for connecting to the power supply contact 21. In a closed state of the secondary contactor 37, there is electric continuity between its input and output. In an open state of the contactor 37, there is electric discontinuity between its input and output.

The state of the disconnecting switch 33, that of the main contactor 34 and that of the secondary safety contactor 37 are commanded by the control module 35 so as to place the power supply contact 21 either at the power supply potential, or at the reference potential, to the exclusion of any other possible state.

In the closed position of the disconnecting switch 33, closing the main contactor 34 and opening the secondary contactor 37 makes it possible to connect the power supply contact 21 to the grid 15 and therefore to bring it to the power supply potential.

In the closed position of the disconnecting switch 33, opening the main contactor 34 and closing the secondary contactor 37 makes it possible to connect the power supply contact 21 to the reference cable 16 and therefore to bring it to the reference potential.

The ground transceiver module 36 is connected to a ground antenna 38 provided in the power supply contact 21. Similarly, for the rear system 12, the ground transceiver module 36 is connected to a ground antenna 39 provided in the power supply contact 22.

The ground transceiver module 36 is able to transmit, continuously and periodically, a first signal incorporating a code, which is characteristic of the recharging function.

Advantageously, the code transmitted by a ground antenna makes it possible to distinguish the front system 11 from the rear system 12.

The module and the ground antenna are such that the first signal is transmitted with a relatively high power, so as to have a relatively substantial range of approximately several tens of centimeters. The frequency used is preferably several kHz, for example 38 kHz.

The module and the ground antenna allow the reception of a second signal transmitted by the tram, indicating that the contact shoe is in the immediate vicinity of the corresponding power supply contact.

The control device 35 is able to keep the main contactor 34 closed and to keep the contactor 37 open as long as the ground transceiver module 36 is receiving a second signal.

Figure 3:
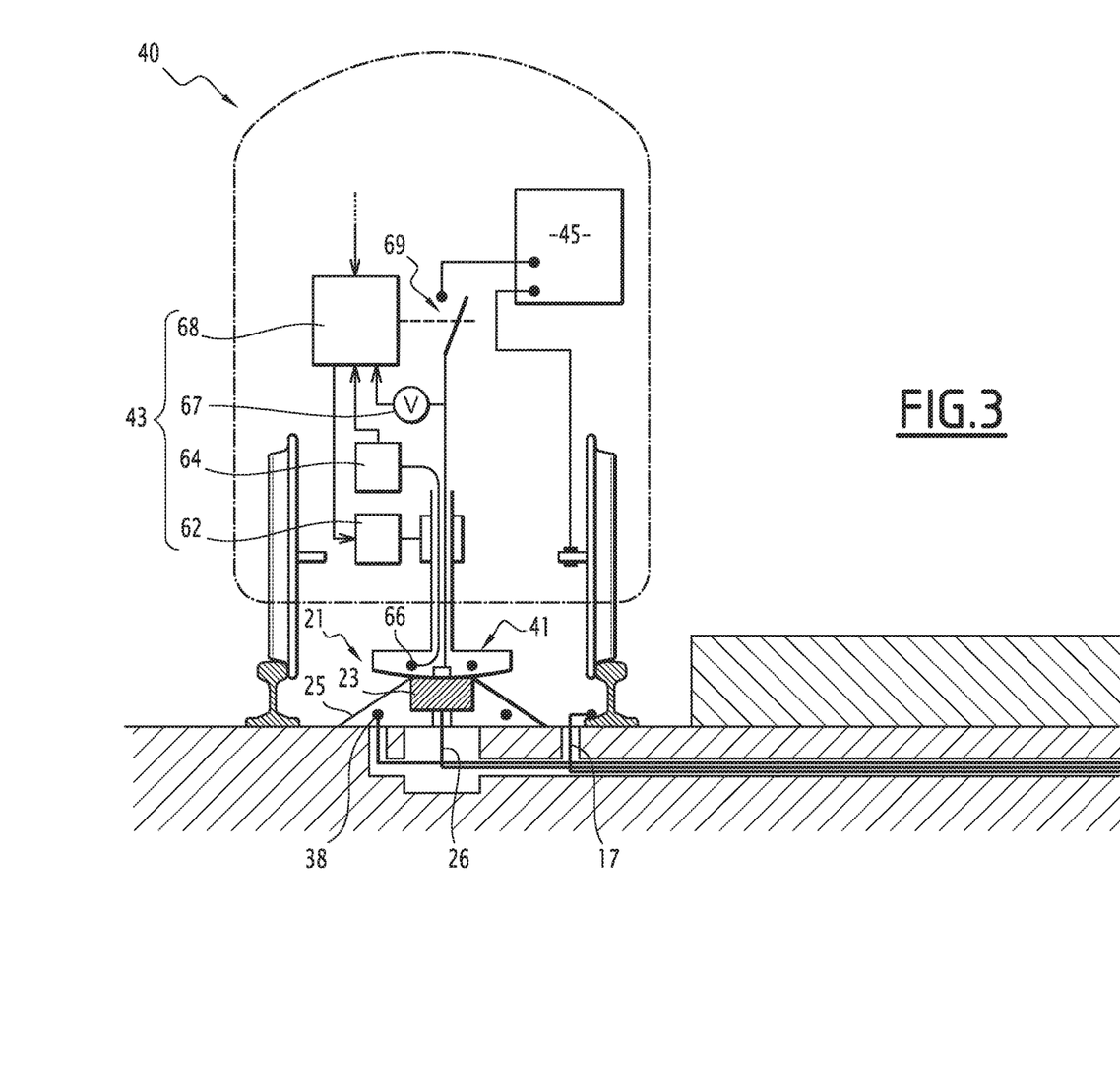
FIG. 3 is a sectional diagrammatic illustration of the tram of FIG. 2, at a power supply contact of one of the two stationary recharging systems.

As shown diagrammatically in FIG. 3, the power supply contact, such as the power supply contact 21, is installed on the concrete ground of the track, between the two lines of rolling rails, substantially at the middle of the platform along which the tram stops.

The power supply contact 21 is made up of a conductive track 23 maintained by an isolating soleplate 25. Similarly, a power supply contact 22 is made up of a conductive track 24 maintained by an isolating soleplate 25.

The conductive track 23 is made from an electrically conductive material. It has a parallelepiped shape with a substantially rectangular section. The upper face of the conductive track is exposed, so as to allow contact with a contact shoe of the tram.

The isolating soleplate 25 is made from an electrically insulating material. It allows the fastening of the power supply contact 21, 21, respectively, on the concrete apron making up the ground of the track. The isolating soleplate 25 is provided with a peripheral channel intended to receive the ground antenna 38, 39, the latter then forming a loop around the conductive track 23, 24.

Passages provided below the power supply contact 21, 22, respectively, in the concrete apron allow the conveyance of an antenna cable, the connecting cable 26, 27, connected to the conductive track 23, and optionally a linking cable 17, to the housing containing the switching device. The cables are thus buried.

The monitoring device 71 of the system 11 includes a module 73 for measuring the voltage of the segment 23 of the contact 21 and an alarm module 74.

In particular depending on the voltage measurement delivered by the module 73, the alarm module 74 is able to generate a local alarm signal intended for the control module 35 so that the latter opens the disconnecting switch 33 if a malfunction is detected.

In particular depending on the voltage measurement delivered by the module 73, the alarm module 74 is able to generate a general alarm signal intended for a short-circuit means 80 of the or each power source of the facility 10.

More specifically, the short-circuit means 80 includes a first pilot line 81 connecting, in series, relays 83 equipping each pair of recharging systems of the stations S2, S1 and S0, and a short-circuit switch 88 at the first sub-station 18 and a second pilot line 82 connecting, in series, relays 83 equipping each pair of recharging systems of the stations S3, S4 and S5 and a short-circuiting switch 89 at the second sub-station 19.

A short-circuiting switch, when closed, makes it possible to short-circuit the terminals of the corresponding sub-station such that no power can be transmitted by the sub-station over the power grid 15.

During normal operation of the facility 10, the short-circuiting switches 88, 89 are open. If a major failure is detected, the short-circuiting switches 88, 89 are closed.

Thus for example, when an alarm module 74 transmits a general alarm signal, the relay 83 associated with the recharging system in question ceases to send a pilot signal along the pilot line 81 or 82. The short-circuiting switch situated at the end of the pilot line closes, no longer receiving the pilot signal. The source is thus isolated from the rest of the facility. A closing signal is also sent to the short-circuiting switch of each of the other sub-stations of the section so as to guarantee that no power supply contact of the section can be brought to the power supply potential.

In the present embodiment, the current return means is made up of one of the metal rails of the track, the tram being equipped with metal wheels. In the case of a vehicle guided on tires or a non-guided vehicle, the current return means may for example be made up of a second contact, brought to the reference potential via the reference cable. This second power supply contact is for example positioned in parallel with the power supply contact.

The tram 40 may optionally be equipped with a feedback device 50 for its stop position able to detect the presence of a positioning beacon, placed on the track, for example at the head of a platform, in a predetermined reference position. Onboard the tram, the feedback device 50 includes a localization antenna able to detect a localization signal transmitted by the beacon. As a function of the received signal, the feedback device 50 controls the stop of the tram such that, when the tram 40 is completely stopped, the localization antenna is situated over the beacon. Such feedback devices are known by those skilled in the art. They make it possible to guarantee the stop of the vehicle in a predetermined position, to within a positioning allowance. For example, for a tram, the known feedback devices have a positioning allowance of about +/−10 cm relative to a reference position associated with the beacon, making it possible, in cases where it is necessary upon stopping, for the doors of the tram to be opposite the landing doors provided on the platform. Alternatively, when the stop is done by the conductor, the positioning precision above the contact is less precise, for example +/−75 cm. The length of the conductive tracks 23 and 24 makes it possible to accept this positioning allowance.

Guaranteeing the stop position of the tram relative to the platform makes it possible to position each power supply contact on the track and each contact shoe on the tram, so as to be certain that each contact shoe can be placed in contact with a corresponding power supply contact when the train is stopped in the predetermined stop position. This then makes it possible for the tram to capture current from the recharging system.

The length of the conductive track of a power supply contact thus depends on the positioning allowance offered by the feedback device used. For an allowance of +/−75 cm, the conductive track therefore has a length of about 1.5 m.

The tram 40 includes an energy storage means 45. This may be any type of known means, in particular super-capacitors (making it possible to store electricity received from the ground in the form of electricity), a flywheel (making it possible to store electricity received from the ground in the form of mechanical energy), etc.

A contact shoe is controlled by a control device. The front contact shoe 41 is controlled by the control device 43, while the rear contact shoe 42 is controlled by the control device 44.

A contact shoe, for example the front contact shoe 41, positioned below the body of the electric vehicle, is movable between a high position, separated from the upper surface of the conductive track 23 of the power supply contact 21, and a low position, in contact with the upper surface of the conductive track 23 of the power supply contact 21.

The contact shoe 41 is moved by an actuator 62 adapted to the control device 43.

The control device 43 includes an onboard transceiver module 64, connected to an onboard antenna 66 borne by the contact shoe 41.

The onboard transceiver module 64 and the onboard antenna 66 are able to receive the first signal sent by the ground transceiver module 36 and the ground antenna 38, irrespective of the high or low position of the contact shoe 41 bearing the onboard antenna, the transmission power of the first signal being high enough. The onboard transceiver module 64 is able to extract the characteristic code contained in the first received signal.

The onboard transceiver module 64 and the onboard antenna 66 are able to transmit a second signal. The second signal is transmitted with a relatively low power, but slightly higher than the detection threshold of the ground antenna 38 and the ground transceiver module 36 such that the ground antenna 38 and the ground transceiver module 36 only detect the second signal when the contact shoe 41 bearing the onboard antenna 66 is in the immediate vicinity of the power supply contact 21, i.e., when it is in the low position, in contact with the latter.

The control device 43 includes a device for measuring the voltage 67, making it possible to determine the instantaneous voltage of the contact shoe 41, in particular if it is in contact with the power supply contact 21 brought to the power supply potential.

The control device 43 includes a computing module 68, able to command the actuator 62 to move the contact shoe 41 from the high position to the low position, so that the contact shoe is placed in contact with the power supply contact, and vice versa, from the low position to the high position so that the contact shoe is separated from the power supply contact.

The computing module 68 is able to verify different constraints before commanding the deployment of the contact shoe.

The computing module 68 verifies that the tram 40 is stopped at a station. This information is for example provided by the device 50 indicating whether the speed of the tram is null. In the affirmative, the computing module 68 is able to transmit an order inhibiting the traction of the tram, in order to prevent any acceleration of the tram while the contact shoe has left its position folded in the high position.

The computing module 68 verifies that the onboard transceiver module 64 receives a first signal transmitted by a ground antenna. More specifically, the computing module 68 verifies the value of the code extracted from the first received signal. This makes it possible to guarantee that the predetermined stop position is reached and the contact shoe is in fact over a recharging system.

The computing module 68 is able to command the onboard transceiver module 64 so that it transmits the second signal periodically.

When the computing module 68 detects the presence of voltage on the contact shoe, it is able to command an onboard switch 69 which, when closed, electrically connects the contact shoe 41 to a first terminal of the energy storage means 45. Another terminal of the energy storage means 45 is connected to the current return means, in the case at hand, the metal wheel of the tram.

The method 100 for using the means described above will now be described in reference to FIG. 4.

Figure 4:
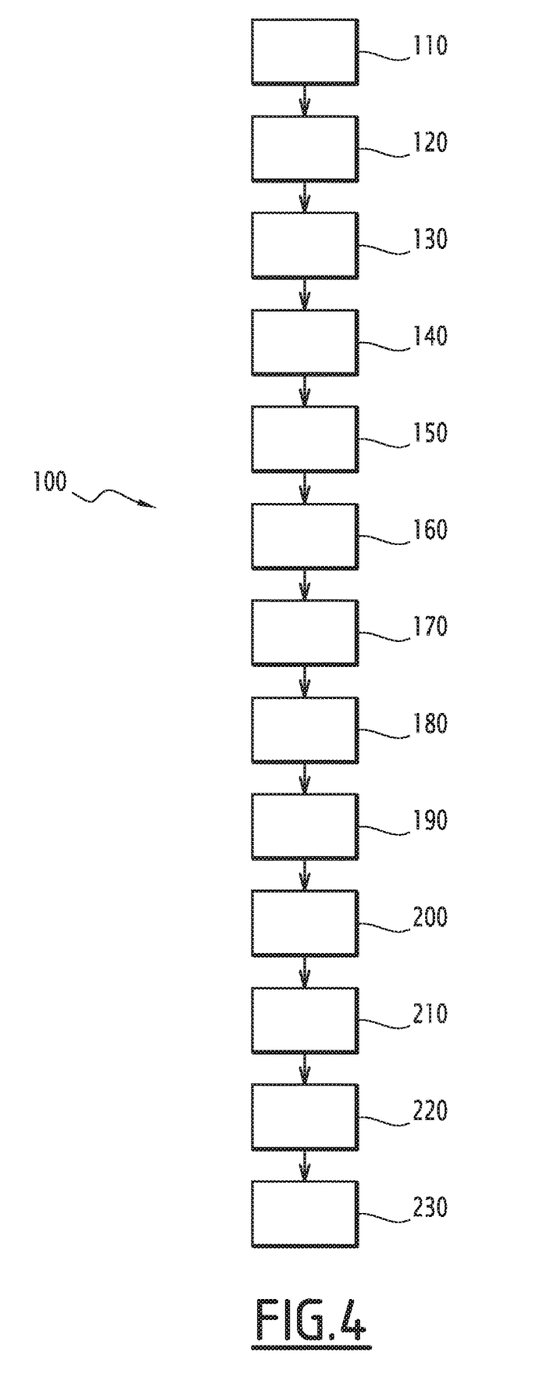
FIG. 4 is a diagrammatic illustration of the different steps of the method for recharging an electric vehicle using the stationary recharging system according to the invention.

In step 110, the ground transceiver module 36 periodically and continuously generates a first signal, incorporating a characteristic code. The conductive track 23 of the power supply contact 21 is at the reference potential of the rail (0 V rail), the contactor 37 being closed and the power contactor 34 being open. The facility 10 working correctly, the short-circuiting switches 88 and 89 of the power supply sub-stations are open and the disconnecting switches 33 of the different systems are closed.

In step 120, when the tram 40 arrives in a station, the conductor of the tram brings the tram 40 to a stop in a predetermined position, which also allows the capture of current.

This position is confirmed by the fact that the onboard transceiver module 64, associated with the front contact shoe 41, receives the first signal transmitted by the ground transceiver module 36 and the ground antenna 38 of the front recharging system 11. The onboard transceiver module 64 extracts the characteristic code therefrom, indicative of the fact that the contact shoe 41 is in fact over the power supply contact 21.

In step 130, the control device 43 associated with the front contact shoe 41 of the tram 40 transmits an order inhibiting traction preventing any restarting of the tram 40. The control device 43 also commands the actuator 62 to deploy the contact shoe 41 so that it comes into contact with the conductive track 23 of the power supply contact 21. The control device 43 next commands the periodic transmission by the onboard transceiver module 64 and the onboard antenna 66 of a second signal.

In step 140, the second signal is captured by the ground transceiver module 36 and the ground antenna 38. The command device 31 thus detects the presence of the tram 40.

Consequently, in step 150, the command module 35 simultaneously commands the opening of the contactor 37 and the closing of the power contactor 34. The conductive track 23 of the power supply contact 21 is then brought to the power supply potential.

In step 160, the onboard device for measuring the voltage 67 detects that the contact shoe 41, in contact with the conductive track 23 of the power supply contact 21, is brought to the reference potential. It informs the computing module 68.

Consequently, in step 170, the computing module 68 closes the onboard contactor 69, allowing the electrical connection of the contact shoe 41 and the storage means 45.

During step 180, electricity is transmitted from the ground to the tram, allowing recharging of the latter.

In step 190, when the computing module 68 decides on the end of recharging, for example when the recharging has reached a predetermined threshold, it commands the opening of the onboard contactor 69 so as to interrupt the current circulating between the contact shoe 41 and the storage means 45.

In step 190, the computing module 68 next commands the onboard transceiver module 64 such that it ceases to transmit the second signal.

In step 200, the ground transceiver module 36 ceasing to receive the second signal, the command device 35 commands the opening of the power contactor 34, and closes the contactor 37 to place the conductive track 23 of the power supply contact 21 at the reference potential.

In step 210, the onboard device for measuring the voltage 67 makes it possible to detect that the contact shoe is now at the reference potential. The computing module 68 commands the actuator 62 so as to raise the contact shoe 41 away from the power supply contact 21, to place it back in the high position, allowing the circulation of the tram.

In step 220, the computing module 68 cancels its instruction to inhibit traction.

In step 230, the tram accelerates to leave the station.

When the monitoring device 71 detects any failure of the command device 31, for example when the measurement of the potential of the segment 23 is different from the reference potential while no tram is present over the power supply contact 21, it generates a local alarm signal intended for the command module 35. The latter then commands the switching to the open state of the disconnecting switch 33, so as to open the connection between the connecting cable 26 and the grid 15 and close the connection between the connecting cable 26 and the reference cable 16.

Once this local operation for securing the facility [is done], the monitoring device 71 continues to verify the potential of the contact 21 periodically.

If the detected failure persists, the monitoring device 71 generates a general alarm signal intended for the relay 83 to which the recharging system is connected. The latter interrupts the transmission of the pilot signal, which immediately results in closing the short-circuiting switches 88 and 89 of the power supply sub-stations 18 and 19.

This general operation for securing the facility makes it possible to prevent any power supply of the contacts of the section in question.

Thus, the security of the facility is based on detecting the presence of a tram over a power supply contact through the detection, by the ground, of a signal emitted by the tram, the monitoring at all times of the potential to which each power supply contact is brought, with, if necessary, local securing and/or general securing of the facility if a failure or a malfunction is detected.

The invention claimed is:

1. An assembly made up of an electric vehicle and a recharging system of a stationary conduction type for recharging said electric vehicle when stopped in a predetermined position allowing an energy capture from the recharging system, wherein the recharging system comprises:
    a power supply contact, positioned on the ground and associated with a current return, and
    a switching device to bring the power supply contact to a supply voltage delivered by an electric power source to which the recharging system is connected,
    wherein the electric vehicle comprises:
        a contact shoe electrically connected to an onboard energy storage, the contact shoe being placed below a body of the electric vehicle and movable between a high position, away from the power supply contact, and a low position, in contact with the power supply contact, and
        a control device able to command the movement of the contact shoe from the high position to the low position so that it is placed in contact with the power supply contact, only when the vehicle is stopped in said predetermined position, which is an energy capture position in which the footprint of the electric vehicle covers the power supply contact,
    wherein the assembly further includes a two-way communication equipment between the recharging system and the electric vehicle, including a ground transceiver connected to a ground antenna situated near the power supply contact, and an onboard transceiver connected to an onboard antenna, supported by the contact shoe, the ground transceiver transmitting a first signal continuously over a significant range, the onboard transceiver detecting the first signal in the high position and low position of the contact shoe, the first signal, when it is received, indicating that the contact shoe is over a power supply contact, the onboard transceiver transmitting a second signal over a reduced range, the ground transceiver detecting the second signal only in the low position of the contact shoe, the second signal, when received by the ground transceiver module, indicating that the contact shoe is in contact with the power supply contact.

2. The assembly according to claim 1, wherein the control device detects that the contact shoe, once placed in contact with the power supply contact, is brought to a power supply potential and, consequently, electrically connects the contact shoe to the onboard energy storage by commanding the closing of an onboard switch.

3. The assembly according to claim 1, wherein the electric vehicle is a vehicle guided along a track including at least one metal rail, and the current return is made up of said metal rail connected to a reference potential.

4. The assembly according to claim 1, wherein the electric vehicle is a non-guided vehicle and the current return comprises of a reference contact connected to a reference potential.

5. The assembly according to claim 1, wherein the command device comprises, in series between the source and the power supply contact, a main contactor and a disconnecting switch, making it possible to place the power supply contact exclusively either at the power supply potential or the reference potential.

6. The assembly according to claim 5, wherein the command device comprises a contactor in parallel of the main contactor and the disconnecting switch.

7. The assembly according to claim 1, wherein the power supply contact comprises a conductive track, with which the contact shoe of the electric vehicle comes into contact, and an insulating soleplate fastening the power supply contact on the ground of the track, the insulating soleplate comprising a peripheral channel for receiving the ground antenna.

8. The assembly according to claim 1, delivering a power of about 1 MW, the power supply potential being between 600 V and 1000 V.

9. A recharging system of the stationary conduction type, wherein, in order to cooperate with an electric vehicle so as to form an assembly according to claim 1, the recharging system recharging the electric vehicle when stopped in a predetermined position allowing the energy capture from the recharging system, the recharging system comprises:
    a power supply contact, positioned on the ground and associated with a current return,
    a switching device bringing the power supply contact to a supply voltage delivered by an electricity source to which the recharging system is connected,
    wherein the electric vehicle comprises a contact shoe electrically connected to an onboard energy storage, the contact shoe being placed below a body of the vehicle and movable between a high position, away from the power supply contact, and a low position, in contact with the power supply contact, the electric vehicle including a control device for commanding the movement of the contact shoe from the high position to the low position so that it is placed in contact with the power supply contact, only when the vehicle is stopped in said predetermined position, which is an energy capture position in which the footprint of the vehicle covers the power supply contact.

10. A power supply facility for an electric vehicle, including a plurality of recharging systems according to claim 9.

11. The power supply facility according to claim 10, comprising at least two conduction stationary recharging systems for each predetermined position.

12. An electric vehicle, intended to be incorporated into an assembly according to claim 1.

* * * * *